US012521858B2

(12) United States Patent
Liao et al.

(10) Patent No.: US 12,521,858 B2
(45) Date of Patent: Jan. 13, 2026

(54) SWINGING BRAKE OF ELECTRIC NAIL GUN

(71) Applicant: DE POAN PNEUMATIC CORP., New Taipei (TW)

(72) Inventors: Zhen-Liang Liao, New Taipei (TW); Hai-Lun Ma, New Taipei (TW); Shun-Yao Yang, New Taipei (TW); Ying-Chieh Liu, New Taipei (TW)

(73) Assignee: DE POAN PNEUMATIC CORP., New Taipei (TW)

( * ) Notice: Subject to any disclaimer, the term of this patent is extended or adjusted under 35 U.S.C. 154(b) by 0 days.

(21) Appl. No.: 18/756,349

(22) Filed: Jun. 27, 2024

(65) Prior Publication Data

US 2025/0121483 A1 Apr. 17, 2025

(30) Foreign Application Priority Data

Oct. 11, 2023 (TW) ................................ 112138805

(51) Int. Cl.
*B25C 1/06* (2006.01)
*B25C 1/00* (2006.01)

(52) U.S. Cl.
CPC ................ *B25C 1/06* (2013.01); *B25C 1/008* (2013.01)

(58) Field of Classification Search
CPC .. B25C 1/06; B25C 1/008; B25C 5/15; B65B 13/025; B65B 13/185; B65B 13/186; B65B 13/22; B65B 13/187; B65B 13/322; B65B 13/327; B65B 57/02
See application file for complete search history.

(56) References Cited

U.S. PATENT DOCUMENTS

| | | | | |
|---|---|---|---|---|
| 7,575,141 | B1 | 8/2009 | Liang et al. | |
| 7,575,142 | B2 | 8/2009 | Liang et al. | |
| 8,991,675 | B2 | 3/2015 | Liang et al. | |
| 2010/0038397 | A1* | 2/2010 | Krondorfer | B25C 1/06 227/8 |
| 2012/0067934 | A1* | 3/2012 | Li | B25C 1/06 227/8 |
| 2022/0161405 | A1 | 5/2022 | Chien et al. | |
| 2022/0371166 | A1 | 11/2022 | Chien | |

* cited by examiner

*Primary Examiner* — Veronica Martin
(74) *Attorney, Agent, or Firm* — HDLS IPR SERVICES; Chun-Ming Shih

(57) ABSTRACT

The invention discloses a swinging brake of electric nail gun for restraining a striker to return to a standard position after shooting the nail. The swinging brake is elastically pivoted on a swing seat of a gun frame, and is extended to form a braking end. The braking end can butt a stopping part on the gun frame when a power flywheel driven by the swing seat is at an idle position, so as to restrain the striker that has returned to the standard position. The braking end can also be driven by the swing seat to leave the stopping part when the power flywheel swings to a transmission position, so that the striker can be released from the standard position to slide along the nailing axial direction to shoot the nail. In this way, the striker in an electric nail gun configured with a swinging power flywheel is improved to accurately return to the standard position after nailing.

15 Claims, 10 Drawing Sheets

(A-A)

(A-A)

SWINGING BRAKE OF ELECTRIC NAIL GUN

BACKGROUND OF INVENTION

1. Field of the Invention

The present invention relates generally to a braking technique for the striker of a flywheel-type of electric nail gun to return to and be maintained at the standard position, and more particularly to a swinging brake of electric nail gun.

2. Description of Related Art

In a flywheel-type of electric nail gun, a rotary actuator (or motor) drives a power flywheel to generate rotational kinetic energy. A power clutch mechanism controls the engagement and transmission time between the power flywheel and a striker, transmitting the rotational kinetic energy to the striker to generate linear momentum for nailing. Specifically, an electromagnet in the power clutch mechanism drives a swing seat (or movable seat), controlling the engagement and transmission time between the power flywheel and the striker.

In addition, in the flywheel-type of electric nail gun. When the striker shoots a nail, an elastic component stores elastic potential energy, and after the striker shoots the nail, the elastic potential energy is immediately released to drive the striker to reset. Moreover, as electric nail guns are more powerful than pneumatic nail guns in generating linear momentum for nailing, the elastic potential energy released by the elastic component after the striker shoots the nail is stronger than pneumatic nail guns. As a result, when the striker moves back to the standard position in the initial standby state (i.e., the striker is reset), it may easily bounce back along the nailing axial direction and will leave the standard position in the initial standby state, causing poor resetting of the striker or occurrence of unexpected secondary nailing.

Furthermore, based on the type of power clutch mechanism, currently existing flywheel-type of electric nail guns can be roughly divided into two types:

The first type is electric nail gun "using an electromagnet to drive the striker to swing and engage with the power flywheel to generate nailing power", as disclosed in Patents US2022161405A1 and US2022371166A1. In this type, the striker is slidably fitted inside a swing seat along a nailing axial direction, the swing seat is pivoted on the gun frame (or machine frame or machine seat, i.e., the fixing end), the power flywheel is pivoted on the gun frame and cannot swing or move, the electromagnet is used to drive the swing seat so that the striker fitted inside can swing to engage with the power flywheel to generate nailing power.

In the above first type of electric nail gun, the striker inside the swing seat must assume two dynamic variables: swing to capture kinetic energy and linear movement for nailing. Under this condition, according to disclosures of Patents US2022161405A1 and US2022371166A1, the gun frame is configured with a brake component (can also be called clasp or stopping or locking component), so that when the striker moves to reset under the drive of the elastic component, the brake component can restrain the striker, and the striker can move back to the standard position in the initial standby state. This can avoid poor resetting of the striker or unexpected secondary nailing. Moreover, when needed, the brake component can release the striker to generate linear momentum for nailing. Specifically, Patent US2022371166A1 further discloses that the brake component is a swing type stopping component, and the stopping component can only be actuated to swing when a safety sliding bar presses the work piece to be nailed, so as to unlock the striker before nailing.

However, under the condition that the striker must assume the above two dynamic variables, the requirement for accuracy during assembly of the brake component (also called swing type stopping component) will be relatively high. This will increase the cost of production and assembly to enhance structural accuracy, and will have adverse influence to the maintenance of braking quality during long-term use.

The second type is disclosed in U.S. Pat. Nos. 7,575,141B, 7,575,142B2, and 8,991,675B2, i.e., electric nail gun "using an electromagnet to drive the power flywheel swing or move to be engaged with the striker to generate nailing power". In this type, the swing seat (or guide seat) is pivoted (or flexibly configured) on the gun frame, provided for pivot connection of the power flywheel (not for pivot connection of the striker), the striker is slidably configured inside the gun frame along a nailing axial direction, not able to swing or move, the electromagnet drives the swing seat (or movable component) so that the power flywheel can move or swing to engaged with the striker, generating nailing power.

In the above second type of electric nail gun, the striker only needs to assume one dynamic variable: linear movement inside the gun frame for nailing. Therefore, comparing to the first type of electric nail gun, the striker is more stable. However, to date, this type of electric nail gun still lacks a technique to effectively brake the striker for accurate resetting. Moreover, as the striker of the second type of electric nail gun is slidably configured inside the gun frame, not inside the swing seat as in the first type of electric nail gun. As a result, without redesigning the structure, the swing type stopping component used in the first type of electric nail gun to brake the striker for resetting is not suitable for direct application in the second type of electric nail gun as the brake component to reset the striker. Therefore, an improvement is expected.

SUMMARY OF THE INVENTION

The present invention provides detailed strategies to improve the striker resetting and braking technique of the electric nail gun (i.e., the above second type of electric nail gun) disclosed in U.S. Pat. Nos. 7,575,141B and 7,575,142B2. Specifically, the present invention provides a swinging brake to constrain the reset striker for the electric nail gun "using an electromagnet to drive the power flywheel to swing and engage with the striker to generate nailing power".

In one preferred embodiment, the invention provides a swinging brake for an electric nail gun to restrain the striker and return it to a standard position after shooting the nail. The striker is slidably fitted inside a gun frame along a nailing axial direction. An elastic component is configured between the gun frame and the striker to tow the striker to move and reset along the nailing axial direction after nailing. The gun frame is fixed with an electromagnet and is pivoted with a swing seat. The swing seat is configured with a power flywheel to generate rotational kinetic energy and to move along with the swing seat. The electromagnet can drive the swing seat to swing so that the power flywheel can swing from an idle position to a transmission position. When the power flywheel is at the transmission position, it engages with the striker to drive it to shoot the nail along the nailing axial direction. Specifically, the striker is formed with a stopping part, the swinging brake is pivoted on the swing seat in a form to receive the spring force and can swing along with the swing seat, the swinging brake is extended to form a braking end, the braking end can be pushed upon the stopping part when the power flywheel is at the idle position so as to constrain the resetting striker to stop at the standard position, the braking end can also be driven by the swing seat to leave the stopping part when the power flywheel swings to the transmission position, so as to release the striker at the standard position to slide along the nailing axial direction to shoot the nail.

In further implementation, the swinging brake is a pendulum rod, the swing seat provides a joining part for pivot connection with the pendulum rod, so that the braking end on the pendulum rod maintains a length of the rod from the joining part. More specific details are as follow:

The swing seat is formed with a pivoting end and a resisting end spaced from each other, the swing seat is also formed with a stressing end positioned between the pivoting end and the resisting end at intervals, the swing seat is pivoted on the gun frame via the pivoting end, the resisting end is connected with the electromagnet for transmission, the stressing end is provided for pivot connection of the power flywheel, and the joining part is located on the swing seat between the resisting end and the stressing end.

In further implementation, the power flywheel is driven by a rotary actuator, the rotary actuator is configured on the pivoting end to drive the power flywheel configured on the stressing end. the striker includes a striker seat and a needle bar fixed on the striker seat, the stopping part is formed on an end face of the striker seat connecting the end part of the needle bar.

In another implementation, the power flywheel is driven by a rotary actuator, the rotary actuator is coaxially connected with the power flywheel for transmission and is configured together with the power flywheel on the stressing end. The striker includes a striker seat and a needle bar fixed on the striker seat, the stopping part is formed on an ear seat guiding the striker seat to slide.

In further implementation, the gun frame is configured with a stopping bar to limit the position of the swinging brake. When the power flywheel swings to the transmission position, the braking end is pushed by the stopping bar to leave the stopping part, and when the power flywheel swings to the idle position, the braking end is released from the stopping bar. Specifically, The braking end of the swinging brake is further extended to form a seat part, and a pivoting part is extended between the seat part and the braking end. The swinging brake is pivoted on the swing seat via the pivoting part, and the swinging brake is formed with a groove for the stopping bar to butt. The groove is located between the braking end and the pivoting part. The groove can be replaced by a curved or straight bar formed on the swinging brake not in the shape of a groove.

Based on the above implementations, the present invention can generate the following functions and effects:

1. Under the structural environment where the striker only needs to move back and forth inside the gun frame for nailing, and does not need to swing to capture the kinetic energy, the swinging brake can more accurately stop the striker at the standby position (i.e., reset position). This can effectively avoid poor resetting of the striker or unexpected secondary nailing.
2. The swinging brake can move along with the swing position of the power flywheel. Thus, when the power flywheel is at an idle position without engaging with the striker, the swinging brake can swing to a braking position to stop the striker at the standard position ready for nailing (i.e., to reset), and when the power flywheel swings to a transmission position with engaging the striker, the swinging brake can swing to an unlocked position, so as to release the striker to generate linear momentum for nailing.
3. The present invention eliminates the limitation that the swinging brake must be unlocked through the safety sliding bar, thus avoiding reduced braking effect due to long-term friction of the swinging brake with the safety sliding bar and influence of shock caused by the counter force transmitted from the work piece via the safety sliding bar during the course of nailing.

The implementations and technical effects disclosed above are further presented in detail below through figures and implementation methods.

DETAILED DESCRIPTION OF THE INVENTION

Figure 1:
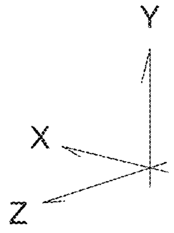
FIG. 1 is a perspective view of the first embodiment of the present invention.
Figure 1:
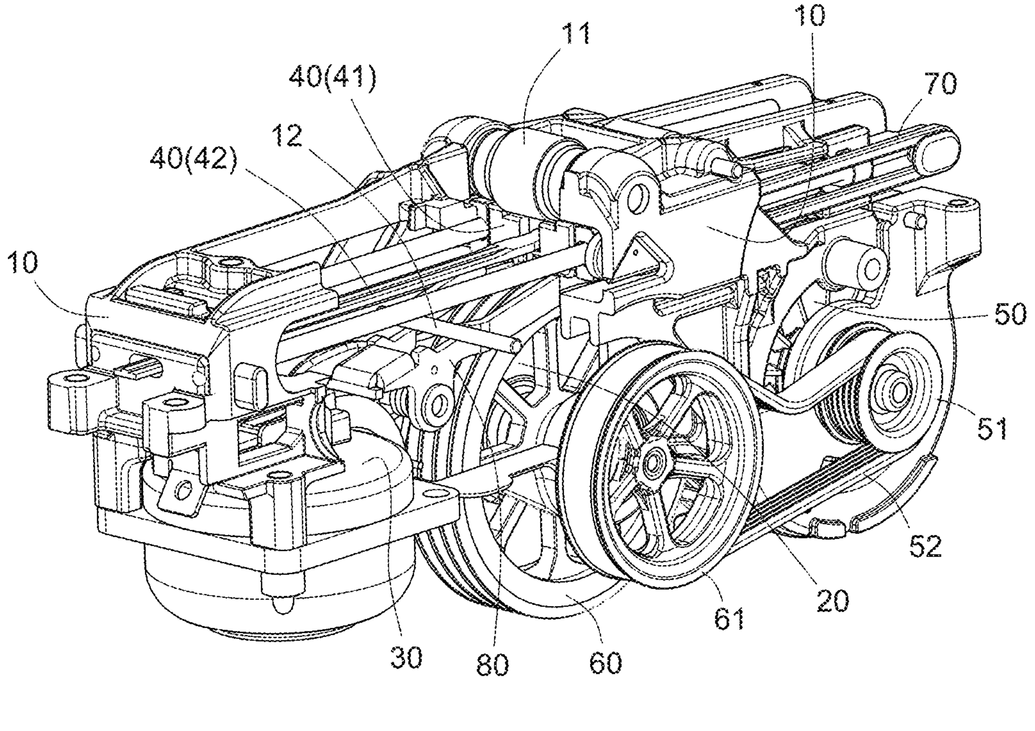
Figure 4:
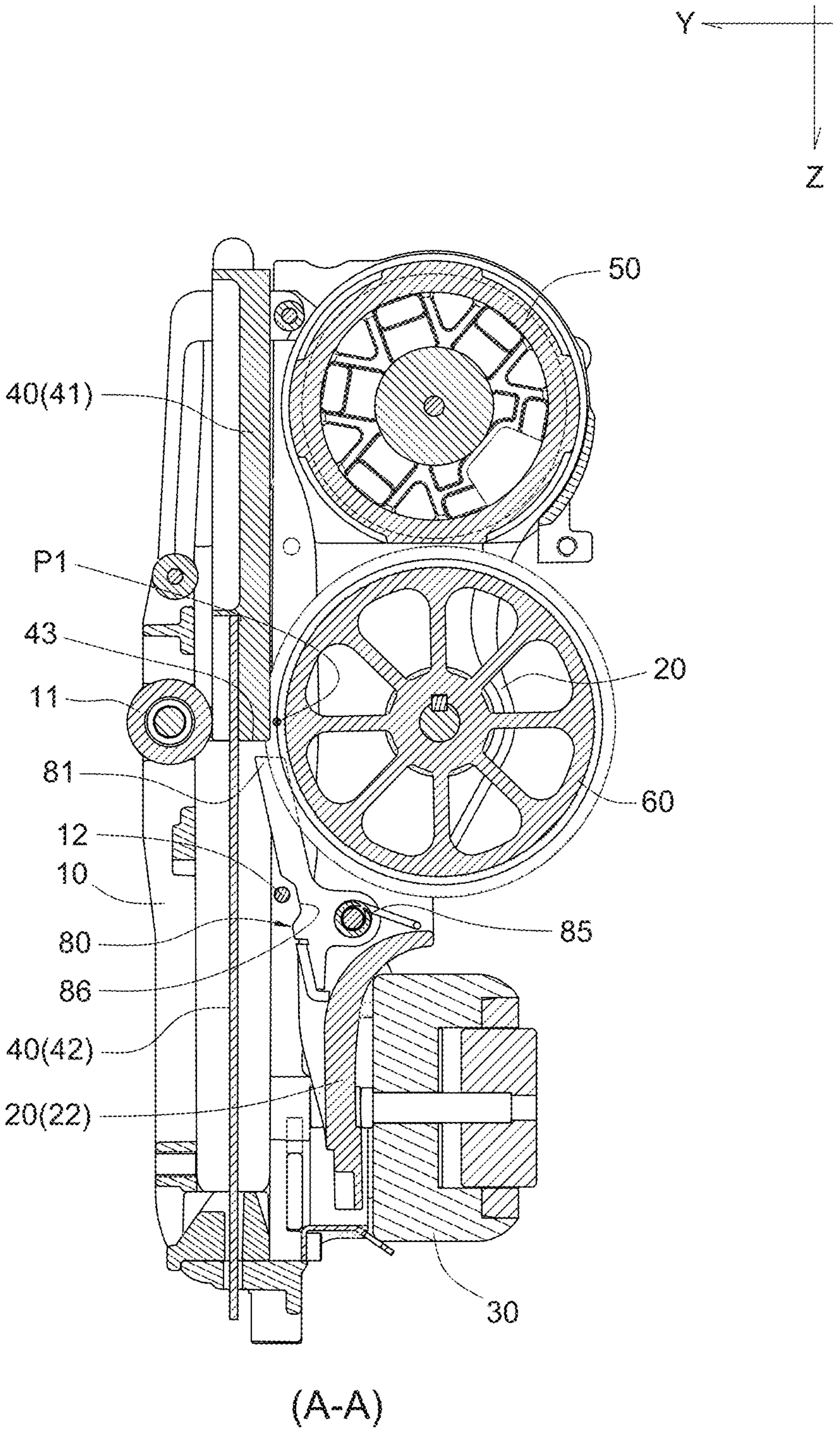
FIG. 4 to FIG. 6 are respectively A-A sectional views of FIG. 3, to sequentially describe the dynamic movement of the swinging brake during the course of nailing.
Figure 5:
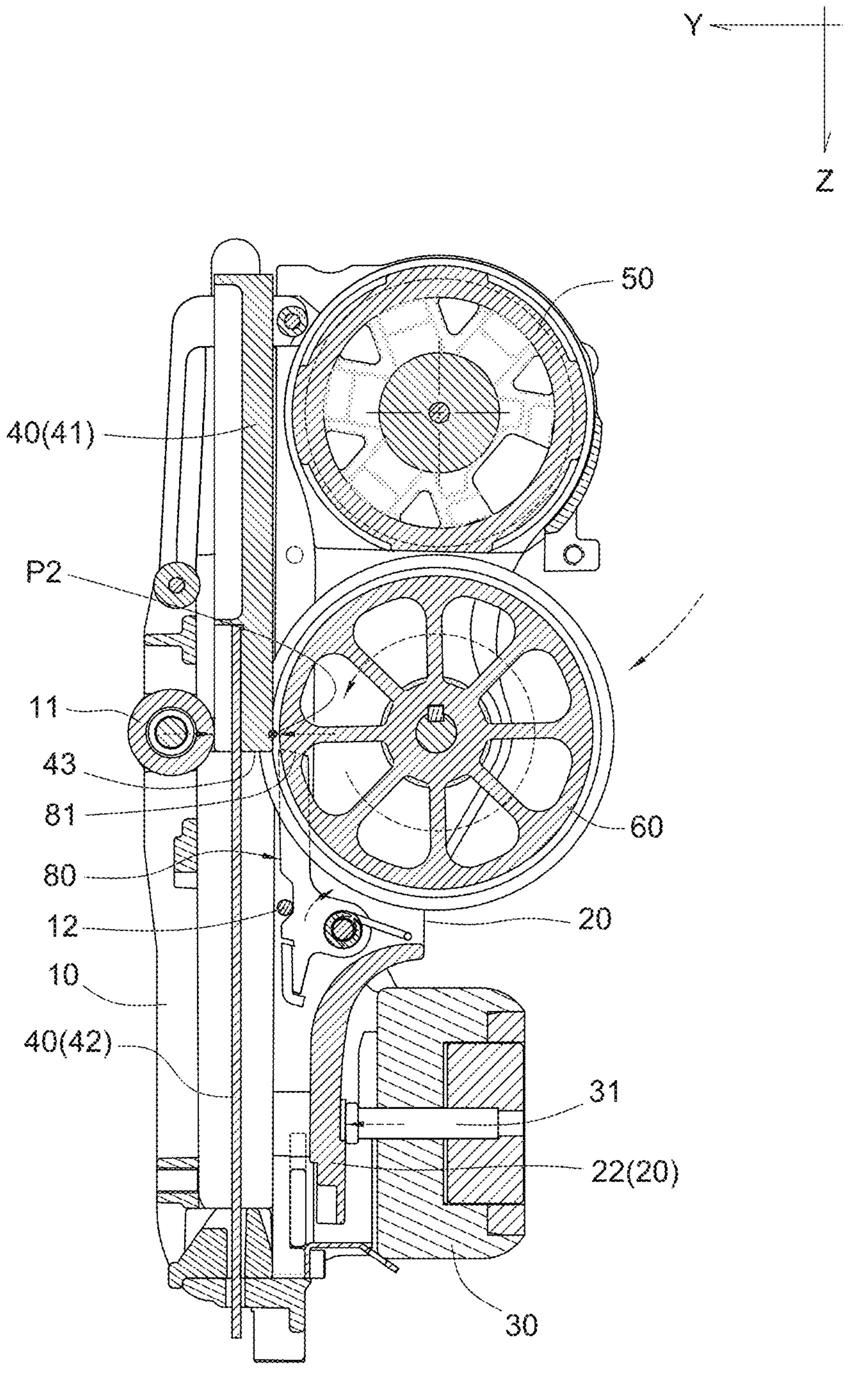
Figure 6:
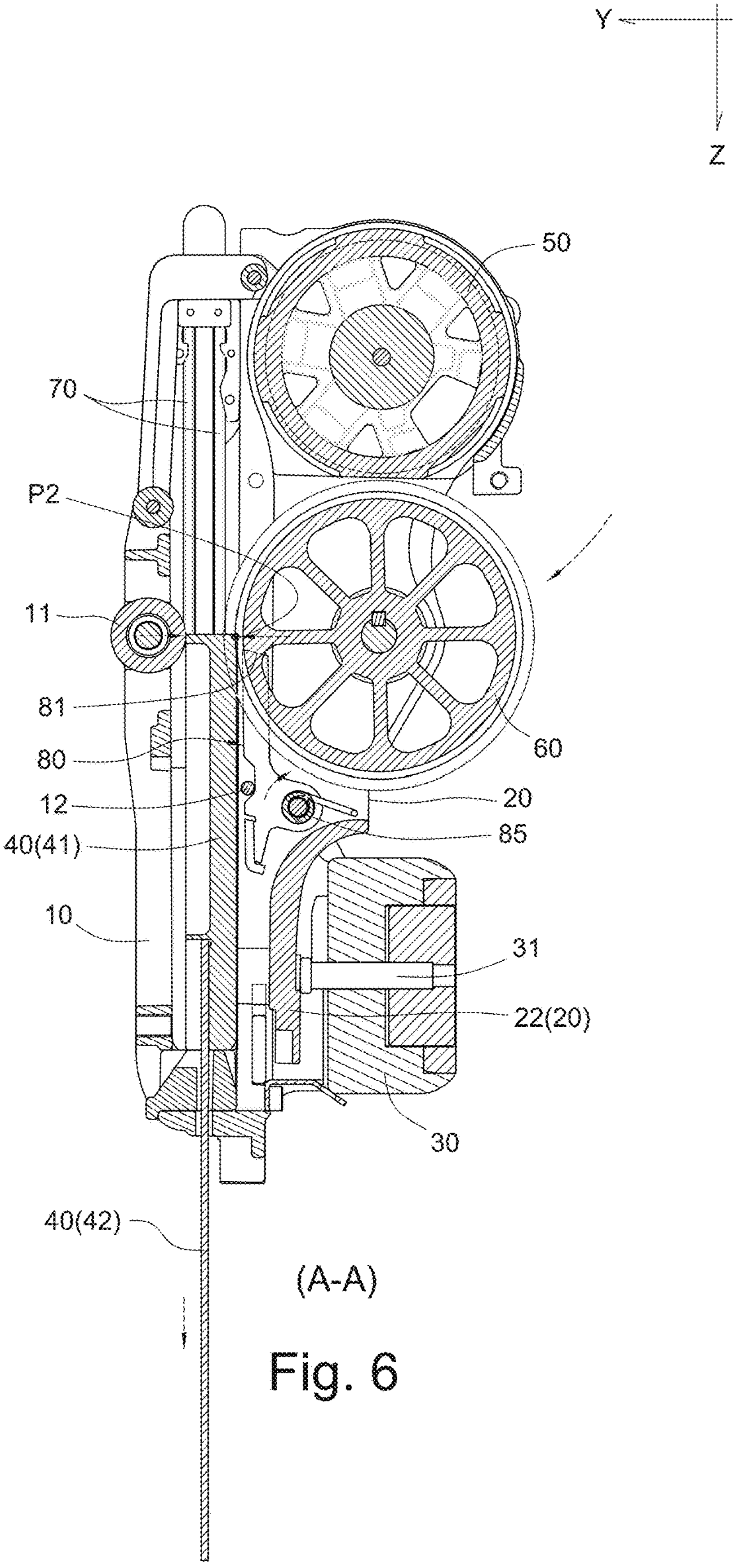

Referring collectively to FIGS. 1 to 6, which disclose an electric nail gun according to the first preferred embodiment of the present invention. To facilitate description, coordinate axes along X-Y-Z-directions are indicated in FIGS. 1 to 6, and when explaining the axial directions of the coordinate axes, the positive and negative quadrants of the adjacent coordinate axes shall be included. The embodiment has the following features:

FIG. 1 discloses the internal structure of the electric nail gun without the general structures of gun shell, battery, trigger, and safety sliding bar. As depicted, the electric nail gun has a gun frame 10 considered as the fixing end, the gun frame 10 is pivoted with a swing seat 20 along the direction of Y axis, so that the swing seat 20 can swing along the Y-Z plane (as shown in FIGS. 4 to 6). The gun frame 10 is fixed with an electromagnet 30 that can apply a force along the direction of the Y axis to push (or pull) an object. The gun frame 10 is further fitted with a striker 40 along a nailing axial direction (i.e., Z-direction).

Figure 2:
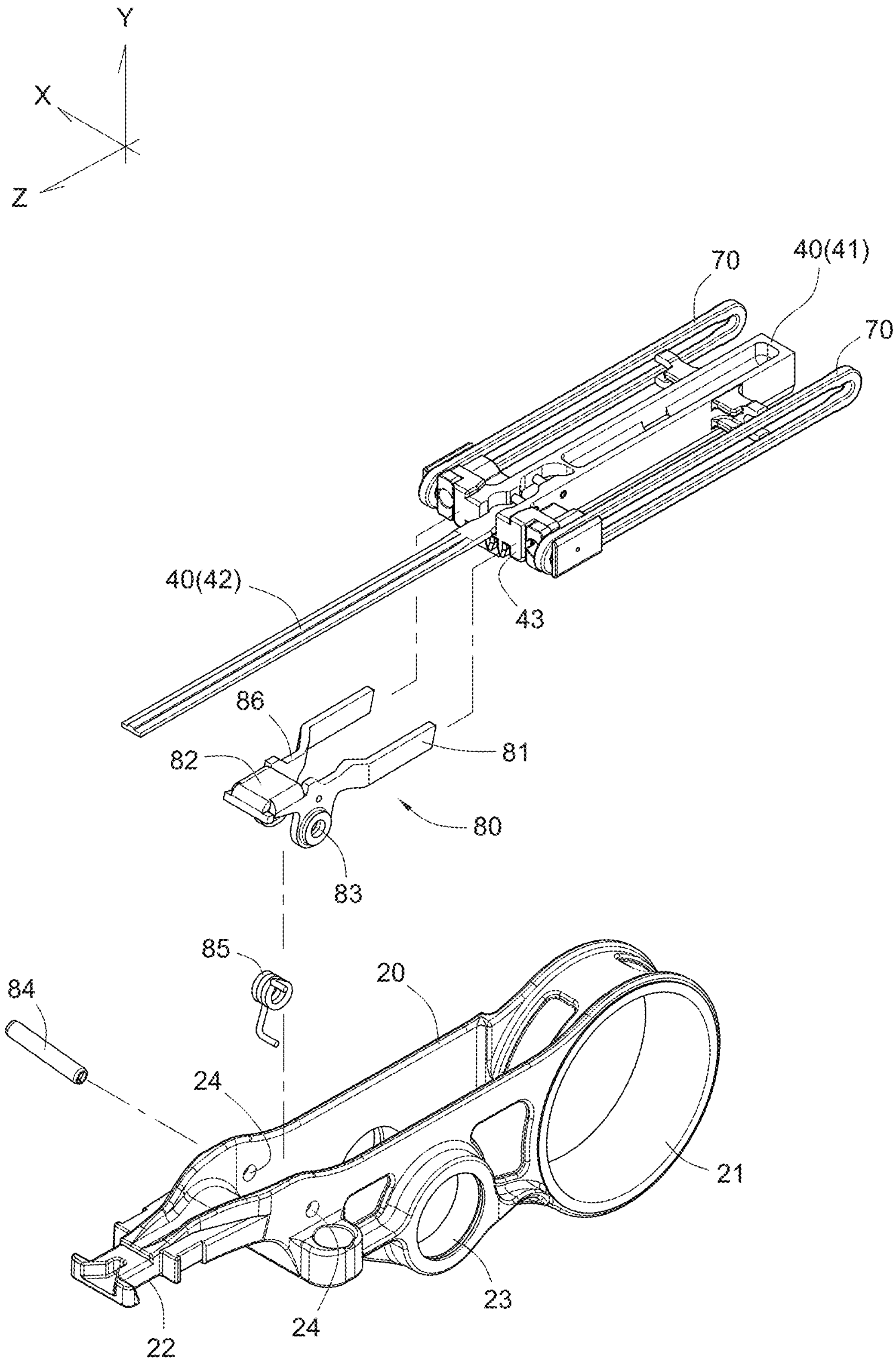
FIG. 2 is a partially exploded perspective view of FIG. 1, showing the perspective views of the swing seat, striker, elastic component, and swinging brake configured on the gun frame depicted in FIG. 1.

Referring to FIG. 2, which discloses the swing seat 20 detached from the gun frame 10 shown in FIG. 1. Its two ends are respectively formed with a pivoting end 21 and a stressing end 22 along the Z-direction, being spaced from each other. In the present embodiment, the pivoting end 21 is formed in the shape of a round frame hole facing the X-direction, used for fixation of a rotary actuator 50 (e.g., an inner rotor motor) shown in FIG. 1 along the X-direction. The swing seat 20 is pivoted on the gun frame 10 via the pivoting end 21. The electromagnet 30 shown in FIG. 1 is used for transmission connection with the stressing end 22, so that the swing seat 20 can be driven by the electromagnet 30 to swing back and forth inside the gun frame 10. The swing seat 20 is further formed with a resisting end 23 spaced between the pivoting end 21 and the stressing end 22 along the Z-direction. In the present embodiment, the resisting end 23 is also formed in the shape of a round frame hole facing the X-direction, for pivotal connection of a power flywheel 60 shown in FIG. 1 along the X-direction.

As shown in FIGS. 1 and 2, respectively, one end of the rotary actuator 50 and the power flywheel 60 is axially connected with a belt wheel 51, 61, and a belt 52 is fitted between the belt wheels 51, 61. Based on such a configuration, through the belt 52 and the belt wheels 51, 61 the rotary actuator 50 can drive the power flywheel 60 on the swing seat 20 to generate rotational kinetic energy for nailing, and when the electromagnet 30 drives the swing seat 20 to swing, the swing seat 20 can drive the power flywheel 60 to swing (or move) between an idle position and a transmission position (to be detailed later) back and forth. In another word, the power flywheel 60 can swing (or move) back and forth along with the swing seat 20 between the idle position and the transmission position, and through the drive of the electromagnet 30, controls the power flywheel 60 to be positioned at the idle position or the transmission position. Moreover, when the power flywheel 60 is positioned at the transmission position, it can be engaged with the striker 40 to drive it to slide along the nailing axial direction Z for nailing (to be detailed later).

FIG. 2 depicts the striker 40 detached from the gun frame 10 shown in FIG. 1. The striker 40 comprises a striker seat 41 and a needle bar 42 fixed on the striker seat 41. The striker 40 is formed with a stopping part 43. In the present embodiment, the stopping part 43 can be formed on an end face of the end part of the striker seat 41 connecting the needle bar 42. In addition, the two sides of one end of the striker seat 41 are respectively fitted with an elastic component 70. In the present embodiment, a rubber string is used as an example of the elastic component 70. The two ends of the elastic components 70 (i.e., rubber strings) are respectively fitted between the striker seat 41 and the gun frame 10 along the nailing axial direction Z, used to store elastic potential energy when the striker 40 slides along the nailing axial direction Z to shoot the nail, and then to release elastic potential energy to tow the striker 40 to slide back to the standard position (i.e., standby position before nailing) along the nailing axial direction Z.

FIG. 2 also discloses a swinging brake 80 detached from the gun frame 10 shown in FIG. 1. The swinging brake 80 is used to restrain the striker 40 after nailing while it is towed by the elastic component 70 back to the initial standard position before nailing, and to position it accurately at the standard position (i.e., the standby position). In the present embodiment, the swinging brake 80 is in the form of a pendulum rod that can swing along the Y-Z plane, and the swinging brake 80 is formed with two braking ends 81 with the length of the rod, and a seat part 82 formed by connecting the extended parts of the two braking ends 81. Two pivoting parts 83 are extended between the seat part 82 and the two braking ends 81. In the present embodiment, the pivoting parts 83 are in the form of a through hole facing the X-direction, and between the two pivoting parts 83, a torque spring 85 can be sleeved on a pivot shaft 84 along the X-direction. The swinging brake 80 can be pivoted on a joining part 24 of the swing seat 20 along the X-direction through the pivot shaft 84. In the present embodiment, the joining part 24 is implemented as an axial hole along the X-direction. The joining part 24 is located on the swing seat 20 between the stressing end 22 and the resisting end 23. In other words, through the torque spring 85, the swinging brake 80 can be elastically supported between the swing seat 20 and the swinging brake 80 to generate elastic force, so that the swinging brake 80 is pivoted on the swing seat 20 in a way to bear the elastic force of the torque spring 85, and is located between the stressing end 22 and the resisting end 23, able to swing back and forth elastically by itself along the Y-Z plane. In addition, the swinging brake 80 can swing along with the swing seat 20, so that the two braking ends 81 can control the time to stop or release the stopping part 43 of the striker 40 by swing and elastic returning (to be detailed later).

Figure 3:
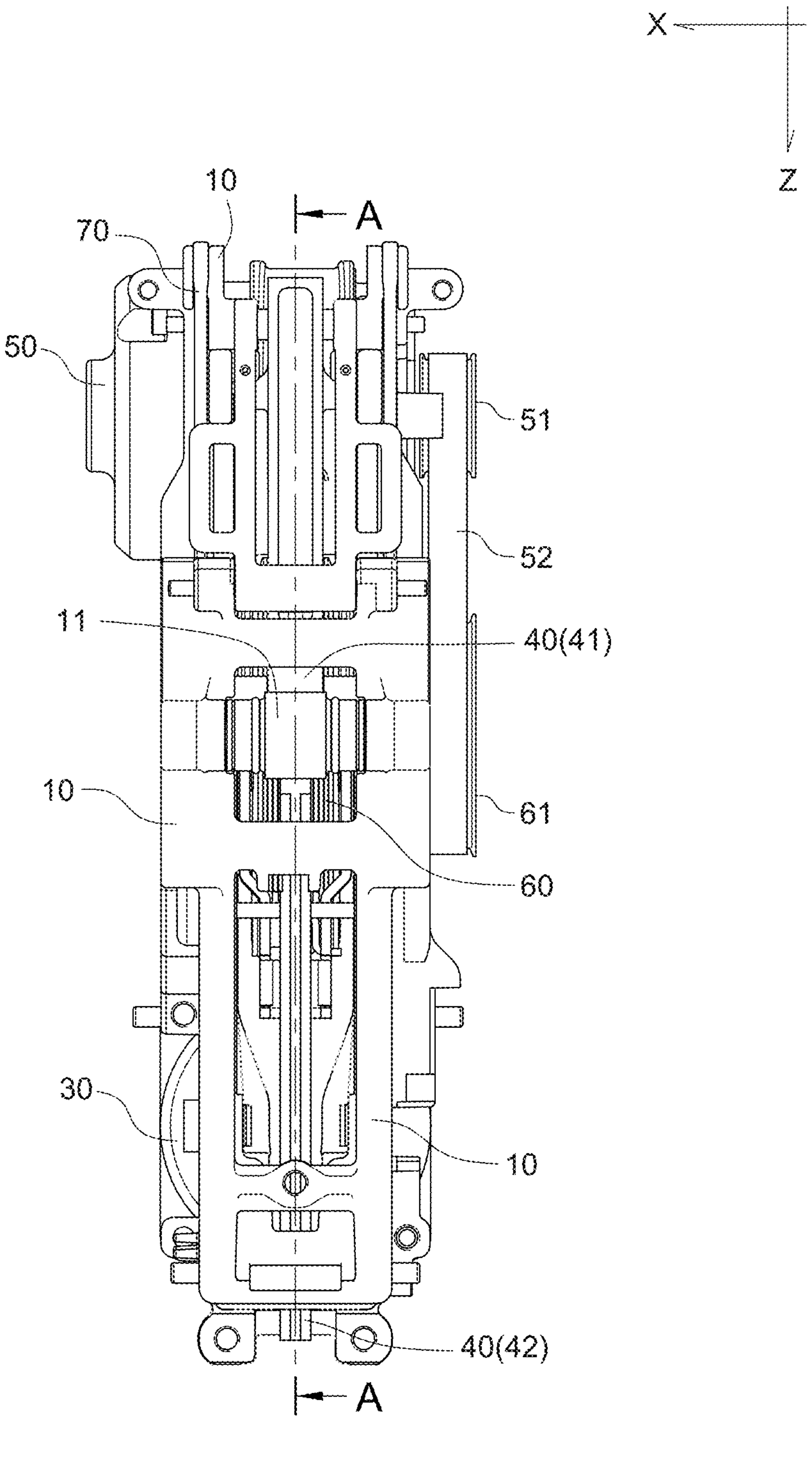
FIG. 3 is a top view of FIG. 1, using A-A section to illustrate the structural layout in FIG. 4 to FIG. 6.

Based on FIG. 3 and the dynamic illustrations of FIGS. 4 to 6, the operational details of the swinging brake 80 are described below.

As shown in FIG. 4, the gun frame 10 is pivoted with a free roller 11 of the striker seat 41 that can roll and contact the striker 40 as disclosed in FIG. 1. When the power flywheel 60 drives the striker seat 41 to slide for nailing, the free roller 11 can offset the counter force to ensure stability of the needle bar 42 of the striker 40 during the course of nailing. In addition, as depicted in FIGS. 1 and 4, the gun frame 10 is attached with a stopping bar 12 along the X-direction to limit the position of the swinging brake 80 that can swing along the Y-Z plane. Furthermore, referring collectively to FIGS. 2 and 4, the bar body of the swinging brake 80 can be formed with at least one groove 86 to be located between the braking end 81 and the pivoting part 83. When the whole swinging brake 80 swings along with the swing seat 20 toward the striker 40, the groove 86 can be butted by the stopping bar 12, so that the two braking ends 81 can swing inversely to leave the locked position of the stopping part 43 of the striker seat 41 along the nailing axial direction Z. Thus, the striker 40 can be released from the standard position 40 to slide along the nailing axial direction Z for nailing (to be detailed later). Specifically, the groove 86 on the swinging brake 80 can also be replaced by the form of a round curved bar or a straight bar not in the shape of a groove, to act as the part to butt the stopping bar 12. Furthermore, the stopping bar 12 can also be replaced by an ear part or stopping block formed on the gun frame 10 in a protruding manner. Such configurations can also accomplish the effect to limit the position of the swinging brake 80, and are equivalent alterations covered by the scope of the present invention.

FIG. 4 further discloses the state of the electric nail gun before nailing. The striker 40 is at the standard position ready for nailing (i.e., standby position). The power flywheel 60 has already been driven by the rotary actuator 50 to accumulate rotational kinetic energy, but the electromagnet 30 has not driven the swing seat 20 to swing toward the striker 40 (along the direction of Y axis). At this point, the power flywheel 60 is at the idle position and accordingly the wheel surface is at an idle point P1 as shown in FIG. 4, and has not rolled to press striker seat 41 of the striker 40. The swinging brake 80 is elastically supported by the torque spring 85, so that the two braking ends 81 are at the locked position of the stopping part 43 that can apply braking action on the striker seat 41. Thus, the striker 40 can be restrained to slide along the nailing axial direction Z to shoot the nail.

Further referring to FIG. 5, the electromagnet 30 under the state shown in FIG. 4 is electrically actuated when the user presses the trigger (not shown in the figure), and its push rod 31 is started to push (can also be implemented to pull) the stressing end 22 of the swing seat 20 along the direction of the Y axis, so that the swing seat 20 drives the power flywheel 60 and the swinging brake 80 to swing toward the striker 40. As a result, the wheel surface of the power flywheel 60 will swing (or move) from the idle point P1 shown in FIG. 4 to a transmission point P2 shown in FIG. 5, and the power flywheel 60 will be at the transmission position. Based on the accumulated rotational kinetic energy, it will touch the surface of the striker seat 41. The free roller 11 provides a counter force to the striker seat 41 to ensure the stability of the striker 40. Under this state, the swinging brake 80 that swings along with the swing seat 20 is butted by the stopping bar 12 so that the two braking ends 81 will swing inversely to leave the locked position of the stopping part 43 of the striker seat 41 along the nailing axial direction Z, and the torque spring 85 of the swinging brake 80 will store elastic force. In this way, the swinging brake 80 can release the striker from the standard position 40, and the striker 40 can slide along the nailing axial direction Z to shoot the nail.

Referring to FIG. 6, under the state shown in FIG. 5, the wheel surface of the power flywheel 60 is at the transmission point P2 to constantly contact the surface of the striker seat 41, and the free roller 11 constantly applies counter force upon the striker seat 41, so as to drive the striker 40 to generate linear momentum for nailing along the nailing axial direction Z, causing the needle bar 42 to shoot the nail immediately along the nailing axial direction Z. During the course, as the swinging brake 80 has released the striker 40 to move along the nailing axial direction Z, the needle bar 42 can successfully and safely shoot the nail along the nailing axial direction Z, and the elastic component 70 will be driven by the striker seat 41 to extend and store elastic potential energy.

Referring back to FIG. 4, after the striker 40 shown in FIG. 6 has completed nailing, the user releases the trigger to cut off the electric power to the electromagnet 30, and the push rod 31 releases the stressing end 22 of the swing seat 20. Consequently, the swing seat 20 drives the power flywheel 60 and the swinging brake 80 to swing away from the striker 40 to reset, so that the wheel surface of the power flywheel 60 moves from the transmission point P2 back to the idle point P1, and will no longer contact the striker seat 41. Under the pulling force from the elastic potential energy stored by the elastic component 70, the whole striker 40 will move along the nailing axial direction Z back to the standard position before nailing (i.e., standby position). The reciprocating travel of the striker for one shot is completed. During the course, driven by the returning swing of the swing seat 20, the swinging brake 80 will move away from the stopping bar 12 on the gun frame 10. In other words, the swinging brake 80 will no longer be limited by the stopping bar 12, and the elastic force stored by the torque spring 85 can be released to drive the swinging brake 80 to swing back. As a result, the two braking ends 81 can swing back to the original position to brake the striker seat 41, as shown in FIG. 4. Therefore, the present embodiment can effectively avoid unexpected secondary nailing or poor resetting of the striker.

FIGS. 7 to 10 collectively disclose the electric nail gun according to the second embodiment of the present invention. To facilitate description, in FIGS. 7 to 10, the relative coordinate axes along X-Y-Z directions are respectively indicated. When explaining the axial directions of the coordinate axes, the positive and negative quadrants of the adjacent coordinate axes shall be included.

Figure 7:
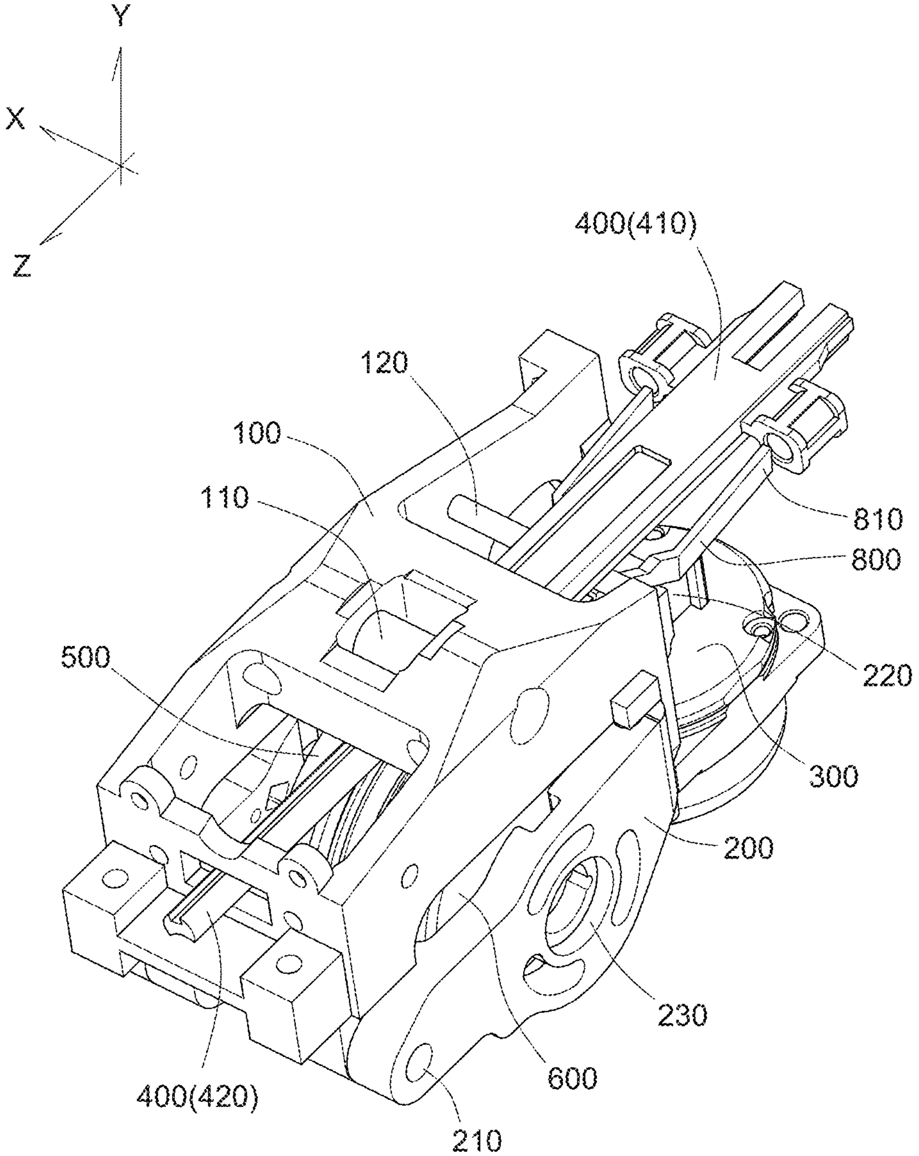
FIG. 7 is a perspective view of the second embodiment of the present invention.
Figure 8:
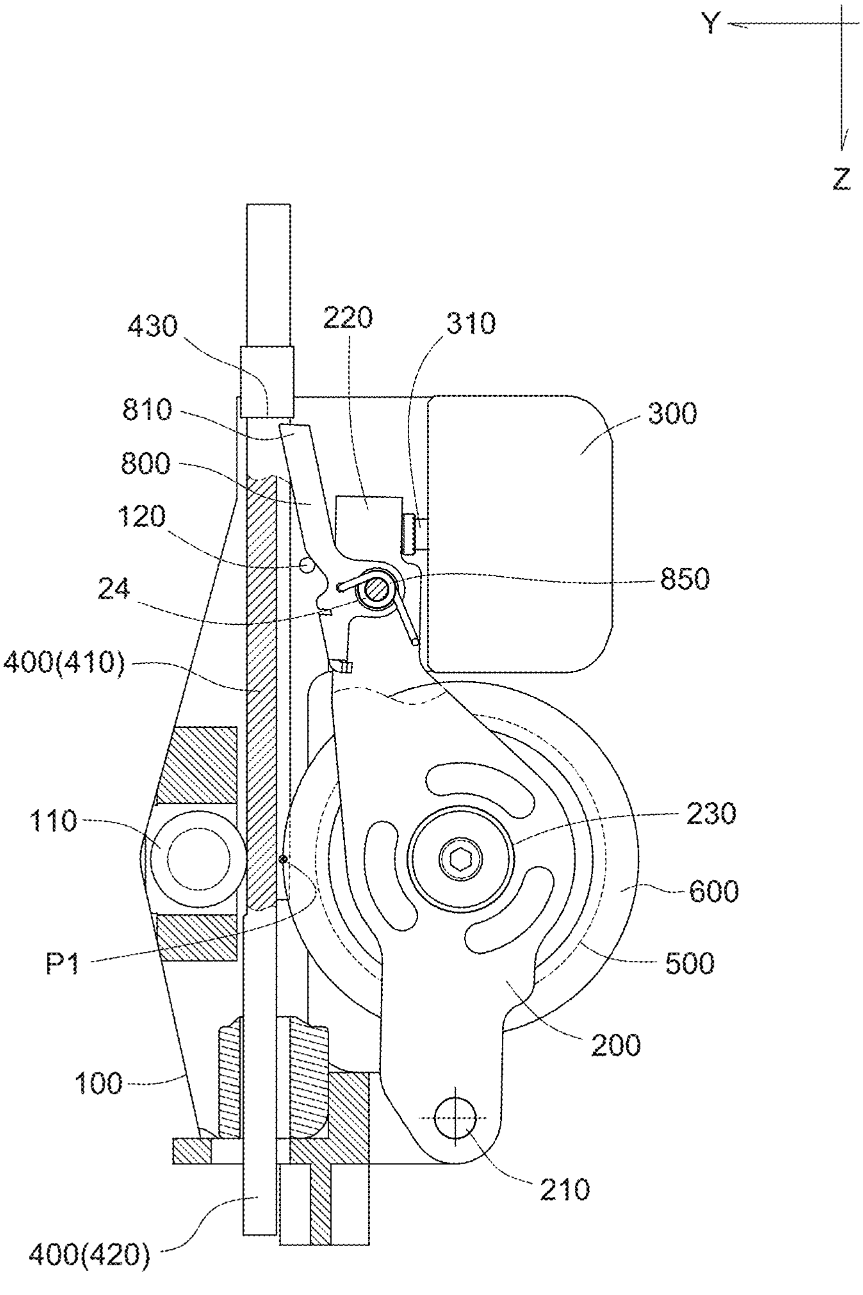
FIG. 8 to FIG. 10 are respectively partially sectional views of FIG. 7, to sequentially describe the dynamic movement of the swinging brake during the course of nailing.

Firstly, referring to FIGS. 7 and 8, the differences between the second embodiment and the first embodiment include the following: The pivoting end 210 on the swing seat 200 is only used for pivot connection with the gun frame 100, and the rotary actuator 500 is not configured on the pivoting end 210. The rotary actuator 500 (e.g., an outer rotor motor) is coaxially coupled with the power flywheel 600 to form an integral body, which is configured on the resisting end 230 of the swing seat 200. Therefore, in the second embodiment, the structures of belt wheel 51, 61 and belt 52 in the first embodiment are omitted. In addition, the stopping part 430 on the striker 400 is changed to an ear seat on the striker seat 410 at a position near the tip end. The ear seat is protruded on the two sides of the striker seat 410 along the X-direction, and the ear seat can be the guide seat for the striker seat 410 to be slidably fitted on the guide column of the gun frame 100, which can be butted by the two braking ends 810 of the swinging brake 800. In addition, except shapes and sizes, the structures of gun frame 100, swing seat 200, electromagnet 300, striker 400, power flywheel 600, elastic component (not shown in the figure), and swinging brake 800 cited in the second embodiment are roughly the same as the first embodiment in structural design and configuration position.

Figure 9:
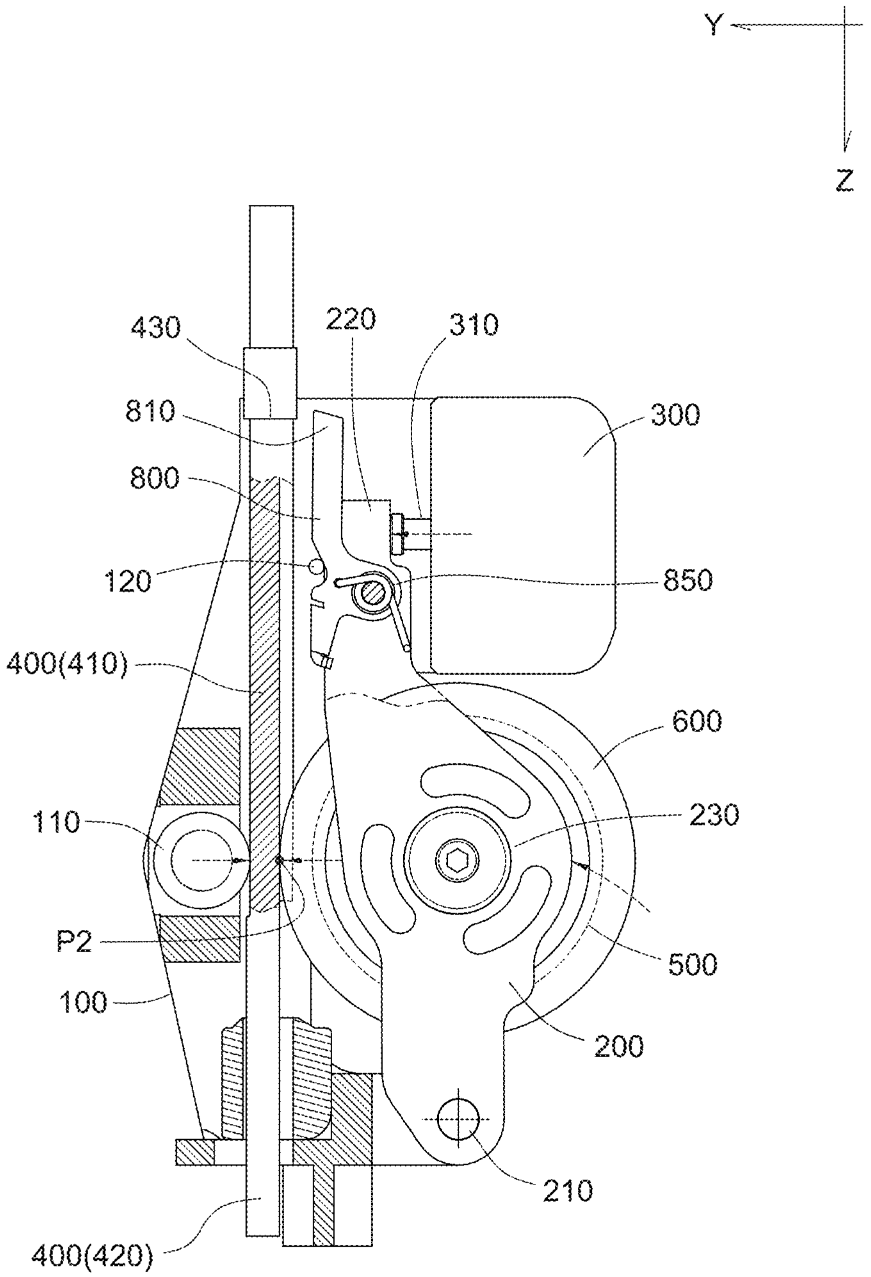
Figure 10:
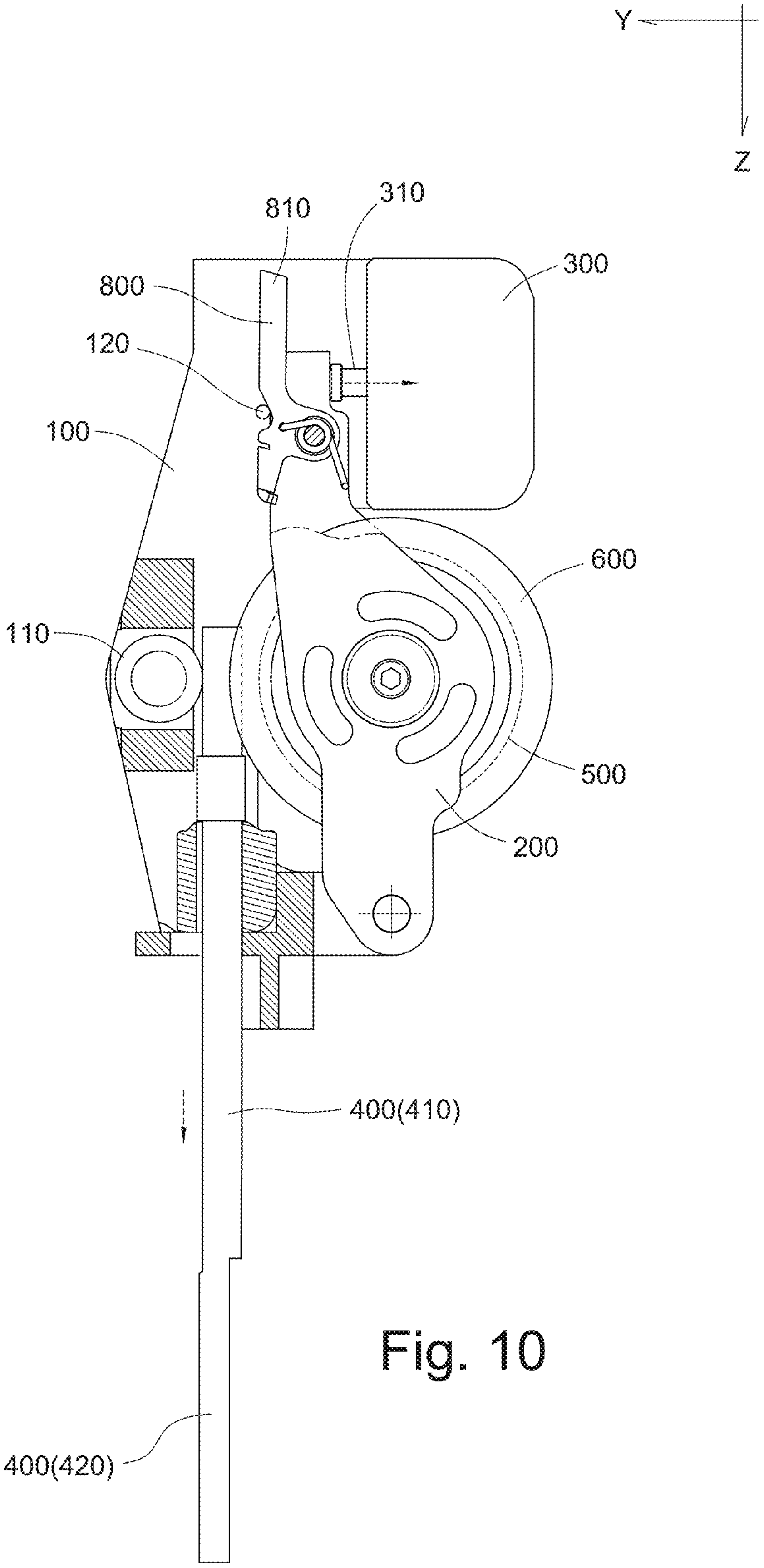

FIGS. 8 to 10 depict the implementation and operation of the swinging brake 800 in the second embodiment. Details are as below:

FIG. 8 discloses the state before nailing. The striker 400 is at the standard position before nailing (i.e., standby position). The power flywheel 600 is driven by the rotary actuator 500 to accumulate rotational kinetic energy but the electromagnet 300 has not driven the swing seat 200 to swing toward the striker 400 (along the direction of Y axis). The power flywheel 600 is at the idle position and accordingly its wheel surface is at the idle point P1, and has not rolled to contact the striker seat 410 of the striker 400. The swinging brake 800 is elastically supported by the torque spring 850 so that the two braking ends 810 are at the locked position of the stopping part 430 to brake the striker seat 410. Thus, the striker 400 can be restrained to slide along the nailing axial direction Z to shoot the nail.

Referring to FIG. 9, when the user presses the trigger (not shown in the figure), the electromagnet 30 is electrified to actuate its push rod 310 to push (can also be implemented to pull) the stressing end 220 of the swing seat 200 toward the direction of Y-axis, so that the swing seat 200 will drive the power flywheel 60 and the swinging brake 800 to swing toward the striker 400, and the wheel surface of the power flywheel 600 will swing (or move) from the idle point P1 shown in FIG. 8 to a transmission point P2 shown in FIG. 9. As a result, the power flywheel 600 is at the transmission position and will contact the surface of the striker seat 410 with the accumulated rotational kinetic energy. The free roller 110 applies a counter force upon the striker seat 410 to ensure the stability of the striker 400. Moreover, under this condition, the swinging brake 800 that swings along with the swing seat 20 is butted by the stopping bar 120 so that the two braking ends 810 will swing inversely to leave the locked position of the stopping part 430 of the striker seat 410 along the nailing axial direction Z, and the torque spring 850 of the swinging brake 800 will store elastic force. In this way, the swinging brake 800 can release the striker 400 from the standard position, and the striker 40 can slide along the nailing axial direction Z to shoot the nail.

Further referring to FIG. 10, the wheel surface of the power flywheel 600 is located at the transmission point P2 to constantly contact the surface of the striker seat 410, and the free roller 110 constantly applies a counter force upon the striker seat 410, driving the striker 400 to generate linear momentum along the nailing axial direction Z, so that the needle bar 420 will instantly shoot the nail along the nailing axial direction Z. During the course, as the swinging brake 800 has released the striker 400 along the nailing axial direction Z, the needle bar 420 can successfully and safely shoot the nail along the nailing axial direction Z, and the elastic component will be extended under the drive of the striker seat 410 to store elastic potential energy.

Referring back to FIG. 7, after the striker 400 shown in FIG. 10 has shot the nail, the user releases the trigger to cut off the electric power to the electromagnet 300. The push rod 310 releases the stressing end 220 of the swing seat 200, so that the swing seat 200 will drive the power flywheel 600 and the swinging brake 800 to swing back in the direction away from the striker 400. As a result, the wheel surface of the power flywheel 600 will move from the transmission point P2 back to the idle point P1, and no longer contact the striker seat 410. At this point, under the pulling force from the elastic potential energy stored by the elastic component, the whole striker 400 will move along the nailing axial direction Z back to the standard position before nailing (i.e., standby position), thus completing the reciprocating travel for one-time nailing. During the course, the swinging brake 800 will be driven by the returning swing seat 200 to move away from the stopping bar 120 on the gun frame 100, and the elastic force stored by the torque spring 850 is released to drive the swinging brake 800 to swing back to its original position, and the two braking ends 810 will swing back to the original position shown in FIG. 7 to brake the striker seat 410 to avoid unexpected secondary nailing or poor resetting of the striker.

The above embodiments only represent preferred implementations of the present invention and are not intending to limit the scope of the present invention. The scope of patent application of the present invention shall be based on the claims.

The invention claimed is:

1. An electric nail gun installed with a swinging brake, wherein the swinging brake is used to restrain a striker to return to a standard position after shooting a nail, the striker is slidably fitted inside a gun frame along a nailing axial direction, an elastic component is configured between the gun frame and the striker to tow the striker to move along the nailing axial direction to reset after shooting the nail, the gun frame is fixed with an electromagnet and is pivoted with a swing seat, the swing seat is configured with a power flywheel to generate rotational kinetic energy and move along with the swing seat, the electromagnet can drive the swing seat to swing so that the power flywheel can swing from an idle position to a transmission position, when the power flywheel is at the transmission position, the power flywheel can be engaged with the striker and the striker is driven to shoot the nail along the nailing axial direction;

wherein, the striker is formed with a stopping part, the swinging brake is pivoted on the swing seat in a form to receive a spring force and can swing along with the swing seat, the swinging brake is extended to form a braking end, the braking end can butt the stopping part when the power flywheel is at the idle position so as to constrain the striker of resetting movement to stop at the standard position, the braking end can also be driven by the swing seat to leave the stopping part when the power flywheel swings to the transmission position, so as to release the striker at the standard position to slide along the nailing axial direction to shoot the nail.

2. The electric nail gun in claim 1, wherein the swinging brake is a pendulum rod, the swing seat provides a joining part for pivot connection with the pendulum rod, so that the braking end on the pendulum rod maintains a length of the pendulum rod from the joining part.

3. The electric nail gun in claim 2, wherein the swing seat is formed with a pivoting end and a resisting end spaced from each other, the swing seat is further formed with a stressing end positioned between the pivoting end and the resisting end at intervals, the swing seat is pivoted on the gun frame via the pivoting end, the resisting end is provided for transmission connection of the electromagnet, the stressing end is provided for pivot connection of the power flywheel, the joining part is located on the swing seat between the resisting end and the stressing end.

4. The electric nail gun in claim 3, wherein the power flywheel is driven by a rotary actuator, and the rotary actuator is configured on the pivoting end to drive the power flywheel configured on the stressing end.

5. The electric nail gun in claim 3, wherein the power flywheel is driven by a rotary actuator, the rotary actuator is coaxially connected with the power flywheel for transmission and is configured together with the power flywheel on the stressing end.

6. The electric nail gun in claim 3, wherein the striker includes a striker seat and a needle bar fixed on the striker seat, and the stopping part is formed on an end face of the striker seat connecting an end part of the needle bar.

7. The electric nail gun in claim 3, wherein the striker includes a striker seat and a needle bar fixed on the striker seat, and the stopping part is formed on an ear seat guiding the striker seat to slide.

8. The electric nail gun in any of claim 2, wherein the gun frame is configured with a stopping bar for restraining the swinging brake, when the power flywheel swings to the transmission position, the braking end is pushed by the stopping bar to leave the stopping part, and when the power flywheel swings to the idle position, the braking end is released from the stopping bar.

9. The electric nail gun in claim 8, wherein the braking end of the swinging brake is extended to form a seat part, and a pivoting part is extended between the seat part and the braking end, the swinging brake is pivoted on the swing seat via the pivoting part, and the swinging brake is formed with a groove for the stopping bar to butt, the groove is located between the braking end and the pivoting part.

10. The electric nail gun in claim 9, wherein the groove can be replaced by a curved or straight bar formed on the swinging brake.

11. An electric nail gun installed with a swinging brake, wherein the swinging brake is used to restrain a striker to return to a standard position after shooting a nail, the striker is slidably fitted inside a gun frame along a nailing axial direction, an elastic component is configured between the gun frame and the striker to tow the striker to move along the nailing axial direction to reset after shooting the nail, the gun frame is fixed with an electromagnet and is pivoted with a swing seat, the swing seat is configured with a power flywheel to generate rotational kinetic energy and move along with the swing seat, the electromagnet can drive the swing seat to swing so that the power flywheel can swing from an idle position to a transmission position, when the power flywheel is at the transmission position, the power flywheel can be engaged with the striker and the striker is driven to shoot the nail along the nailing axial direction; wherein, the striker is formed with a stopping part, the swinging brake is pivoted on the swing seat in a form to receive a spring force and can swing along with the swing seat, the gun frame is formed with a stopping bar for restraining the swinging brake, the swinging brake is extended to form a braking end;

when the power flywheel is at the idle position, the braking end is released from the stopping bar to butt the stopping part, so as to restrain the striker of resetting movement to stop at the standard position; and when the power flywheel swings to the transmission position, the braking end is released from the stopping part through drives from the swing seat and butts from the stopping bar, so as to release the striker at the standard position to slide along the nailing axial direction to shoot the nail.

12. The electric nail gun in claim 11, wherein the swing seat provides a joining part for pivot connection with the pendulum rod, the swing seat is formed with a pivoting end and a resisting end spaced from each other, the swing seat is further formed with a stressing end positioned between the pivoting end and the resisting end at intervals, the swing seat is pivoted on the gun frame via the pivoting end, the resisting end is provided for transmission connection of the electromagnet, the stressing end is provided for pivot connection of the power flywheel, and the joining part is located on the swing seat between the resisting end and the stressing end.

13. The electric nail gun in claim 12, wherein the power flywheel is driven by a rotary actuator, the rotary actuator is configured on the pivoting end to drive the power flywheel configured on the stressing end, and the striker includes a striker seat and a needle bar fixed on the striker seat, the stopping part is formed on an end face of the striker seat connecting an end part of the needle bar.

14. The electric nail gun in claim 12, wherein the power flywheel is driven by a rotary actuator, the rotary actuator is coaxially connected with the power flywheel for transmission and is configured together with the power flywheel on the stressing end, the striker includes a striker seat and a needle bar fixed on the striker seat, and the stopping part is formed on an ear seat guiding the striker seat to slide.

15. The electric nail gun in claim 12, wherein the braking end of the swinging brake is extended to form a seat part, and a pivoting part is extended between the seat part and the braking end, the swinging brake is pivoted on the swing seat via the pivoting part, the swinging brake is formed with a groove for the stopping bar to butt, the groove is located between the braking end and the pivoting part, and the groove can be replaced by a curved or straight bar formed on the swinging brake.

* * * * *